(12) United States Patent
Itonaga

(10) Patent No.: US 12,707,032 B2
(45) Date of Patent: Aug. 11, 2026

(54) PROJECTION DEVICE AND IMAGE PROCESSING METHOD

(71) Applicant: SONY GROUP CORPORATION, Tokyo (JP)

(72) Inventor: Kazuichiro Itonaga, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 475 days.

(21) Appl. No.: 18/262,394

(22) PCT Filed: Jan. 12, 2022

(86) PCT No.: PCT/JP2022/000802

§ 371 (c)(1),
(2) Date: Jul. 21, 2023

(87) PCT Pub. No.: WO2022/163356

PCT Pub. Date: Aug. 4, 2022

(65) Prior Publication Data

US 2024/0073388 A1 Feb. 29, 2024

(30) Foreign Application Priority Data

Jan. 29, 2021 (JP) ................................ 2021-013770

(51) Int. Cl.
*H04N 9/31* (2006.01)

(52) U.S. Cl.
CPC ......... *H04N 9/3194* (2013.01); *H04N 9/3147* (2013.01); *H04N 9/3185* (2013.01)

(58) Field of Classification Search
CPC ... H04N 9/3194; H04N 9/3147; H04N 9/3185
See application file for complete search history.

(56) References Cited

U.S. PATENT DOCUMENTS

2007/0025612 A1* 2/2007 Iwasaki .................. G01B 11/25 382/154
2018/0061263 A1* 3/2018 Nishihara ................ G09B 5/02
(Continued)

FOREIGN PATENT DOCUMENTS

JP 2006-004010 A 1/2006
JP 2015-167001 A 9/2015
(Continued)

OTHER PUBLICATIONS

International Search Report and Written Opinion of PCT Application No. PCT/JP2022/000802, issued on Apr. 5, 2022, 08 pages of ISRWO.

*Primary Examiner* — Kyu Chae
(74) *Attorney, Agent, or Firm* — CHIP LAW GROUP

(57) ABSTRACT

A projection device the present disclosure includes a photographing unit that photographs a sheet on which guided information is entered at a plurality of times of day, the plurality of times of day including a first time of day and a second time of day being later than the first time of day; an image processing unit that extracts a partial characteristic amount of the sheet at the first time of day and a partial characteristic amount of the sheet at the second time of day to compute, at the second time of day, an amount of movement of the sheet from the first time of day; and a projection unit that projects guiding information for the guided information entered on the sheet, at a coordinate position to which the amount of movement of the sheet, computed by the image processing unit, has been added.

16 Claims, 15 Drawing Sheets

(56) References Cited

U.S. PATENT DOCUMENTS

| | | | | |
|---|---|---|---|---|
| 2021/0241447 | A1* | 8/2021 | Kambegawa | G06V 10/993 |
| 2022/0130270 | A1* | 4/2022 | Kataoka | G06V 30/41 |

FOREIGN PATENT DOCUMENTS

| | | | |
|---|---|---|---|
| JP | 2019-070914 | A | 5/2019 |
| JP | 6697726 | B1 | 5/2020 |

* cited by examiner

[FIG. 1]
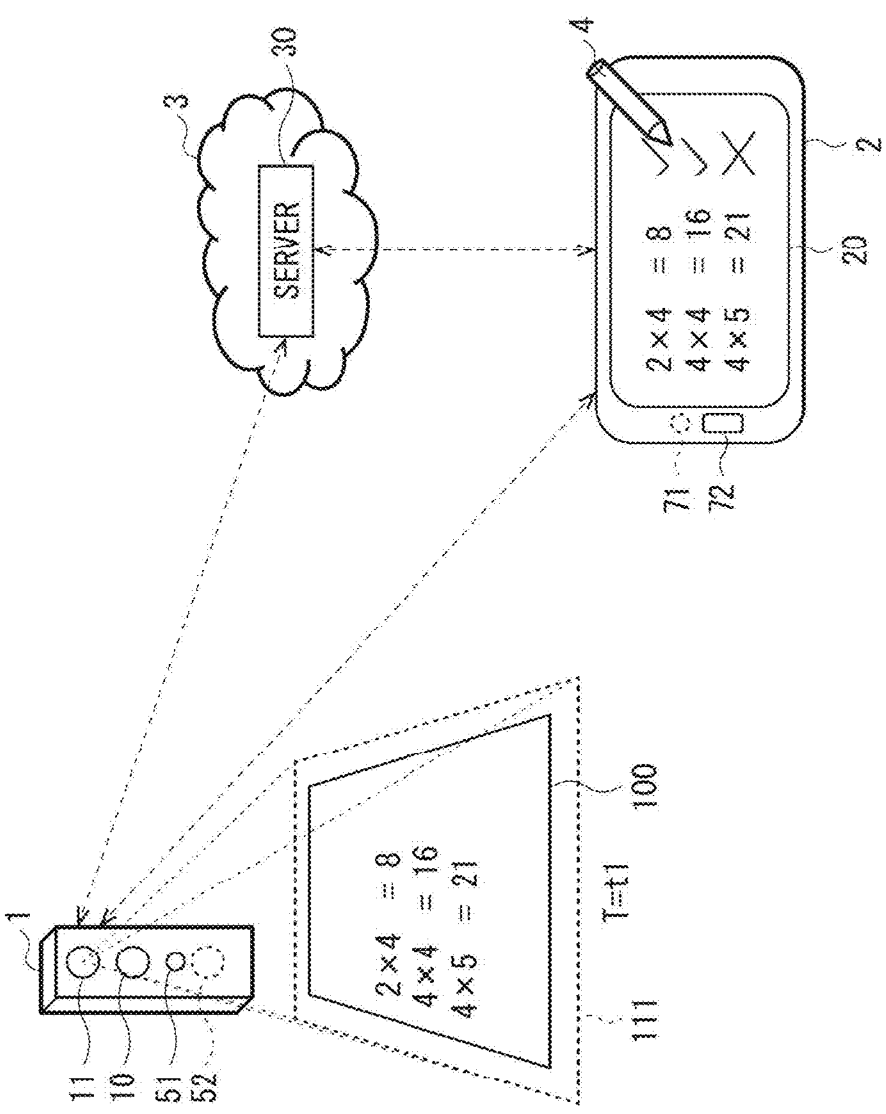

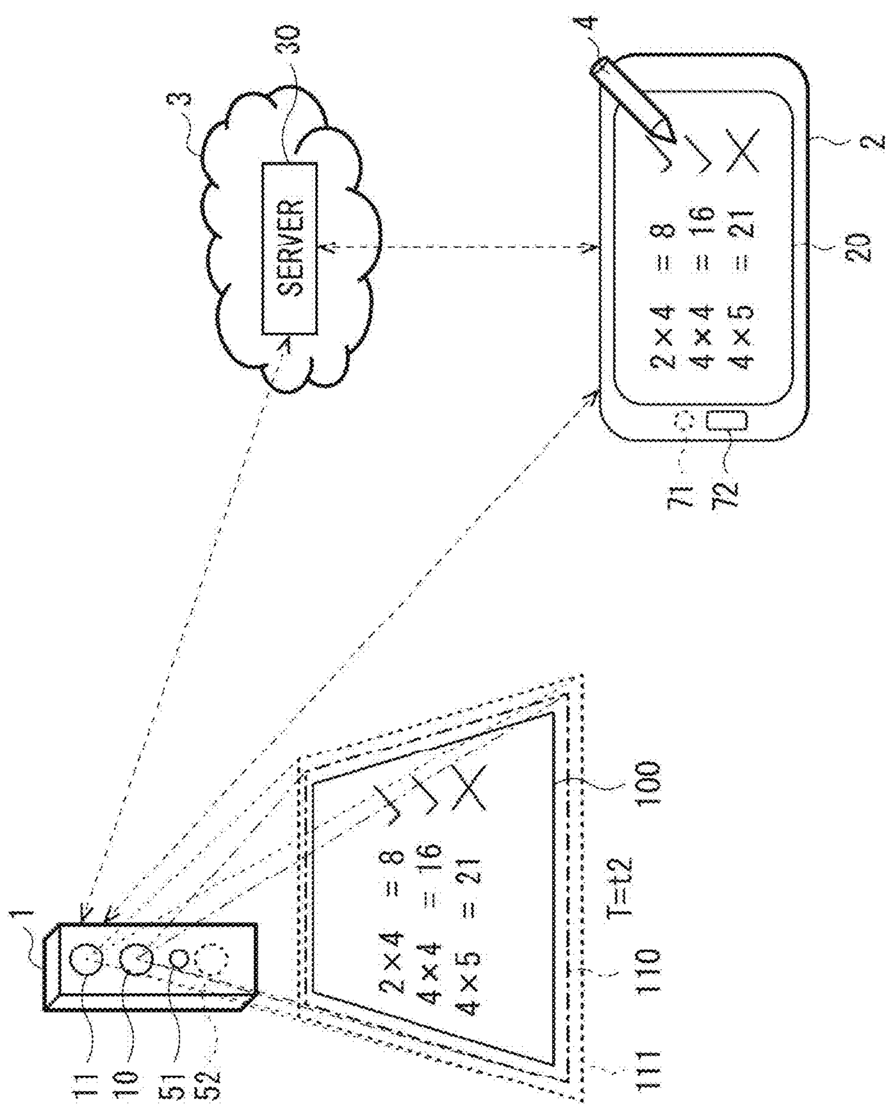
[FIG. 2]

[FIG. 3]
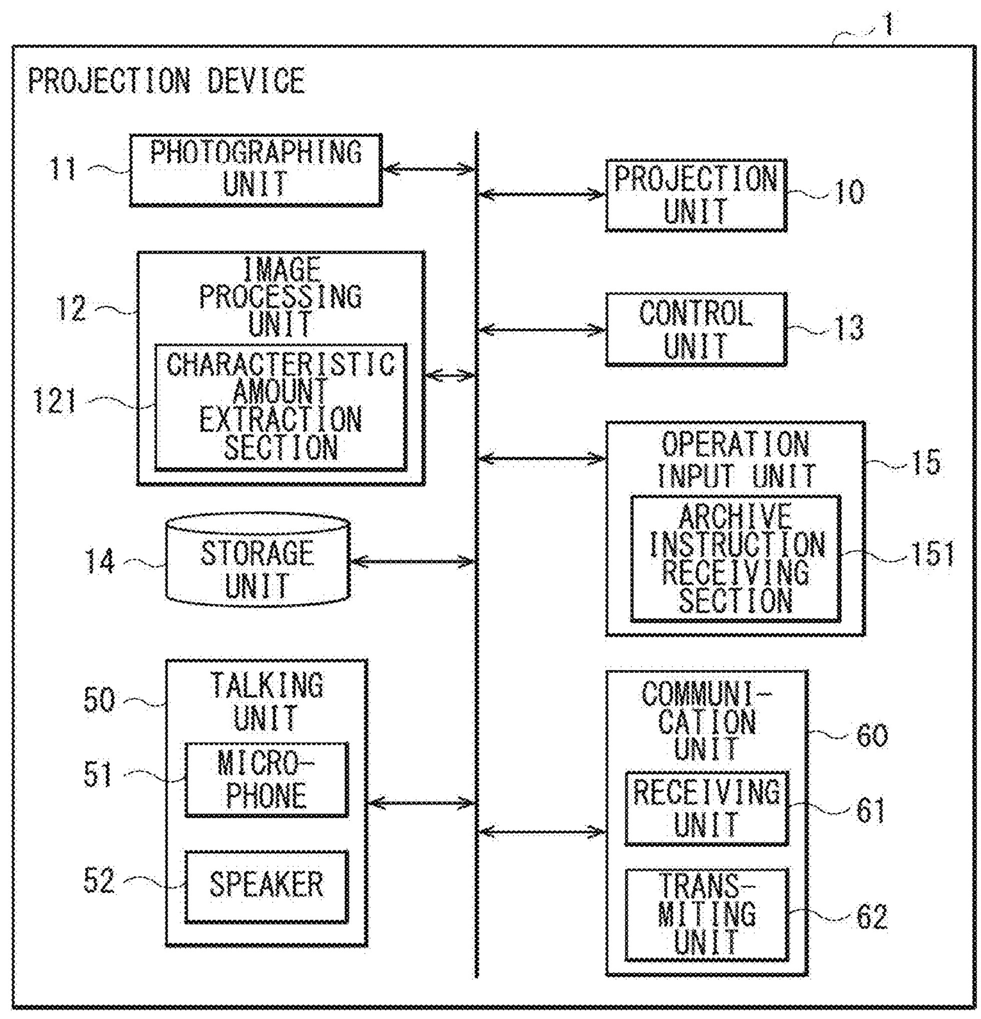

[FIG. 4]
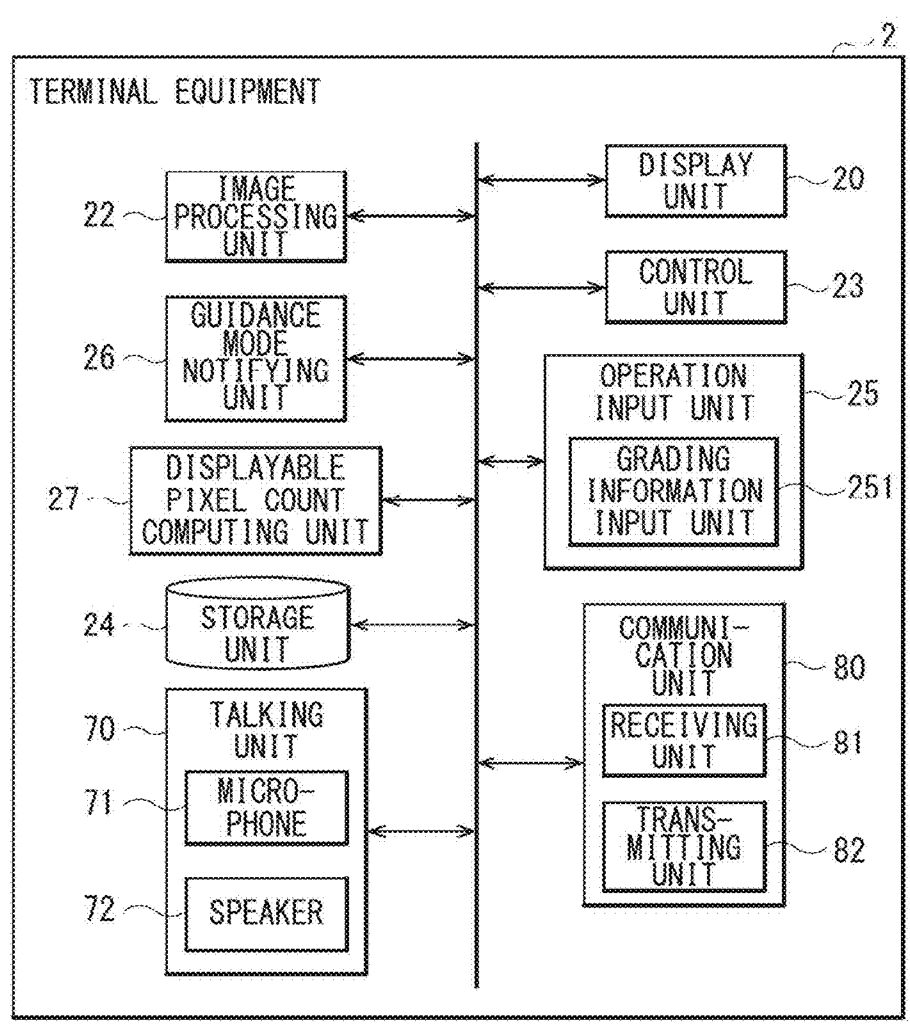

[FIG. 5]
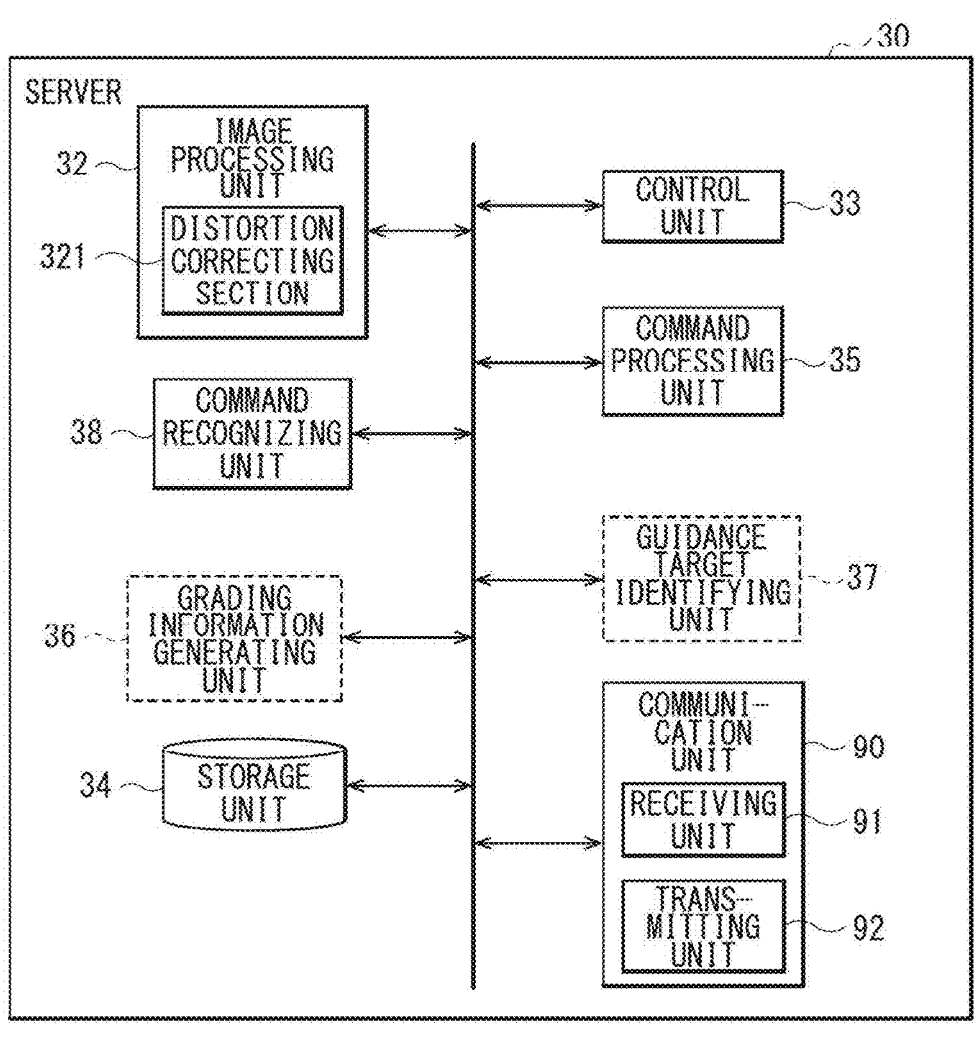

[FIG. 6]
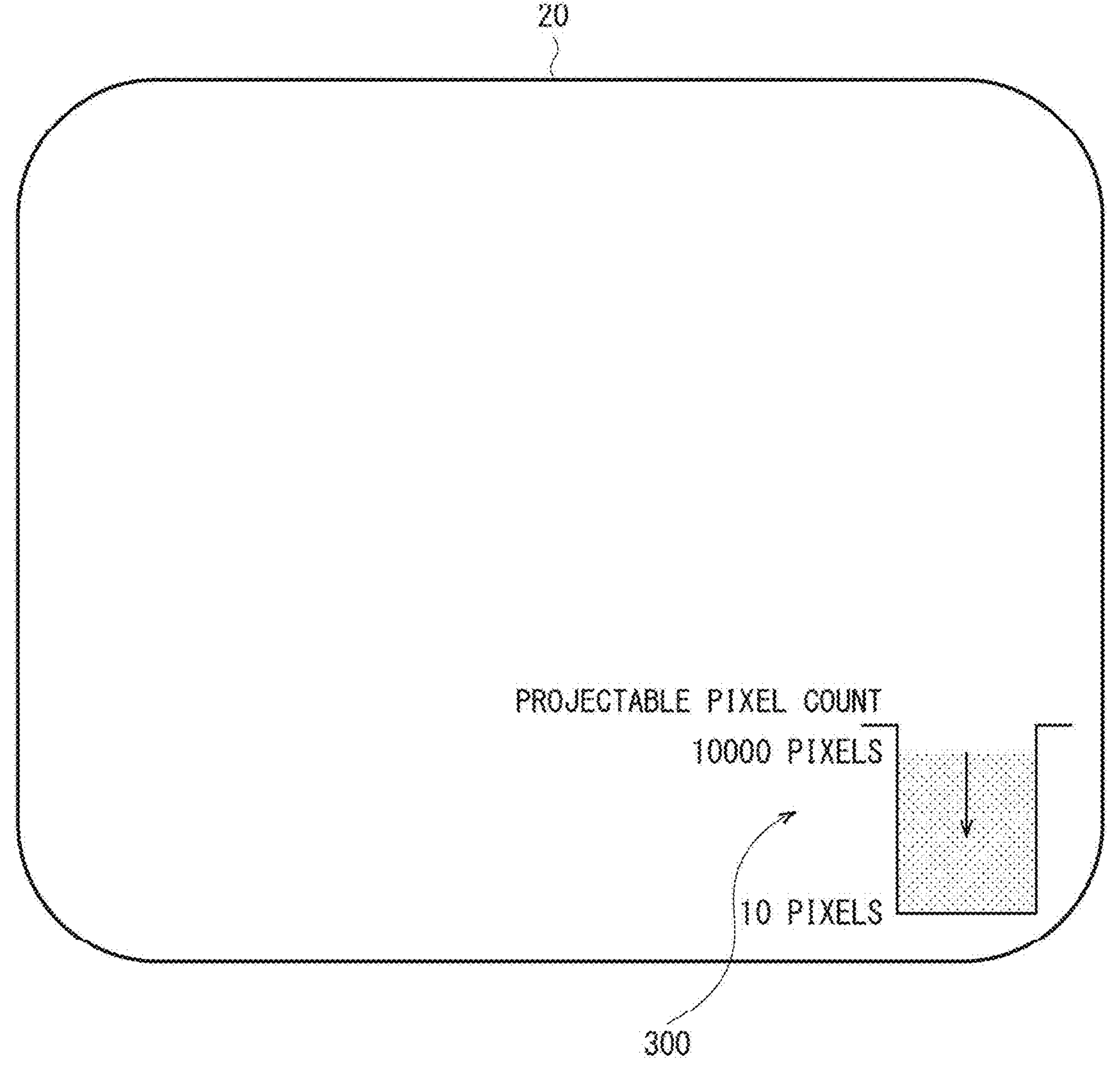

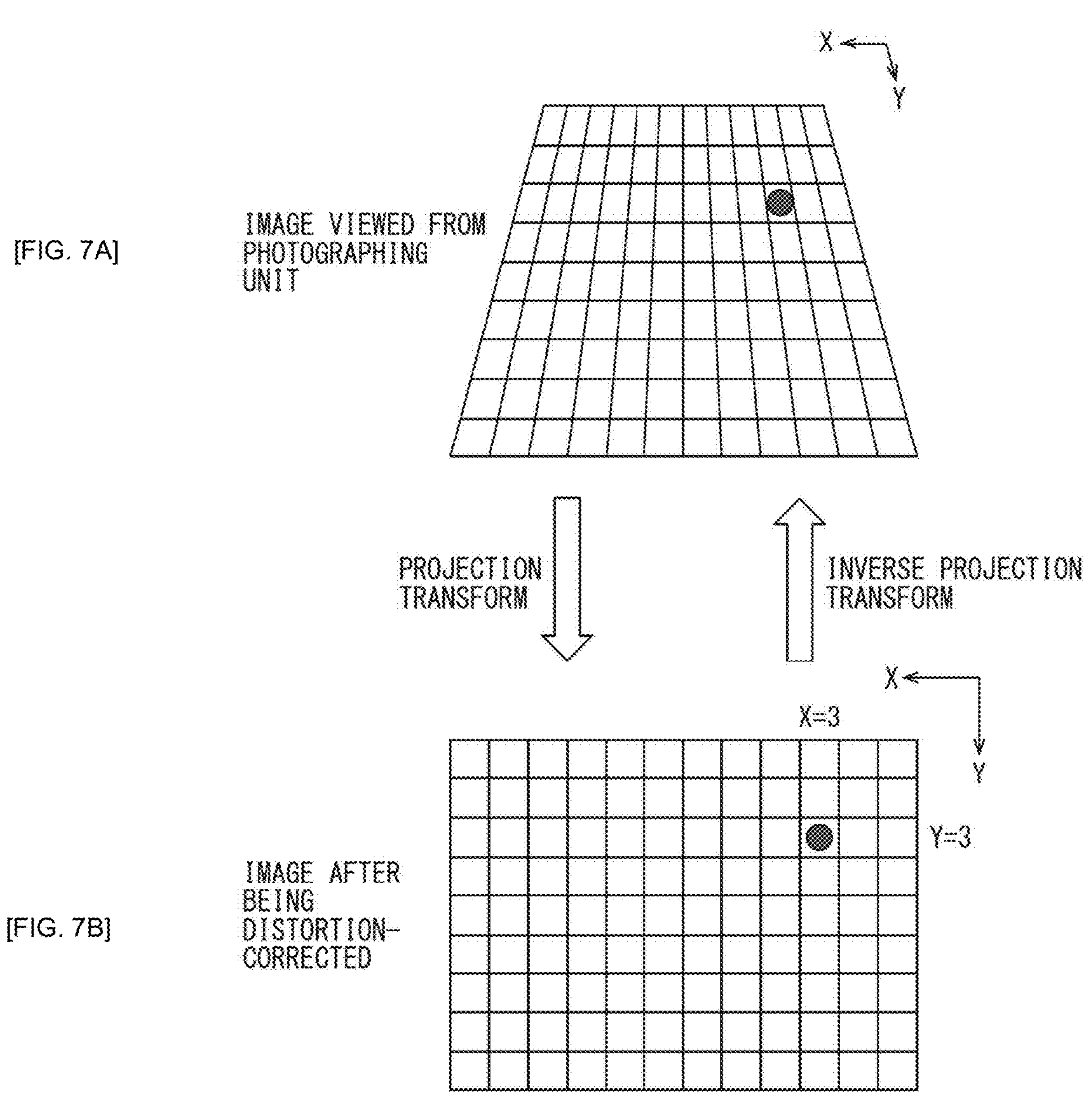
[FIG. 7A]
IMAGE VIEWED FROM PHOTOGRAPHING UNIT
X
Y
PROJECTION TRANSFORM
INVERSE PROJECTION TRANSFORM
X
Y
X=3
Y=3
[FIG. 7B]
IMAGE AFTER BEING DISTORTION-CORRECTED

[FIG. 8]
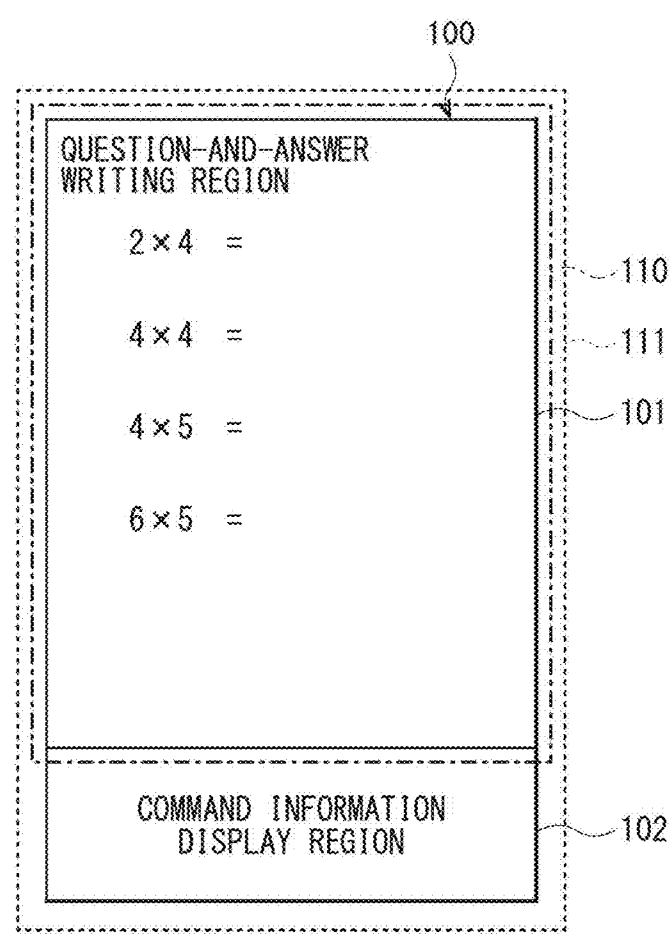

[FIG. 9]

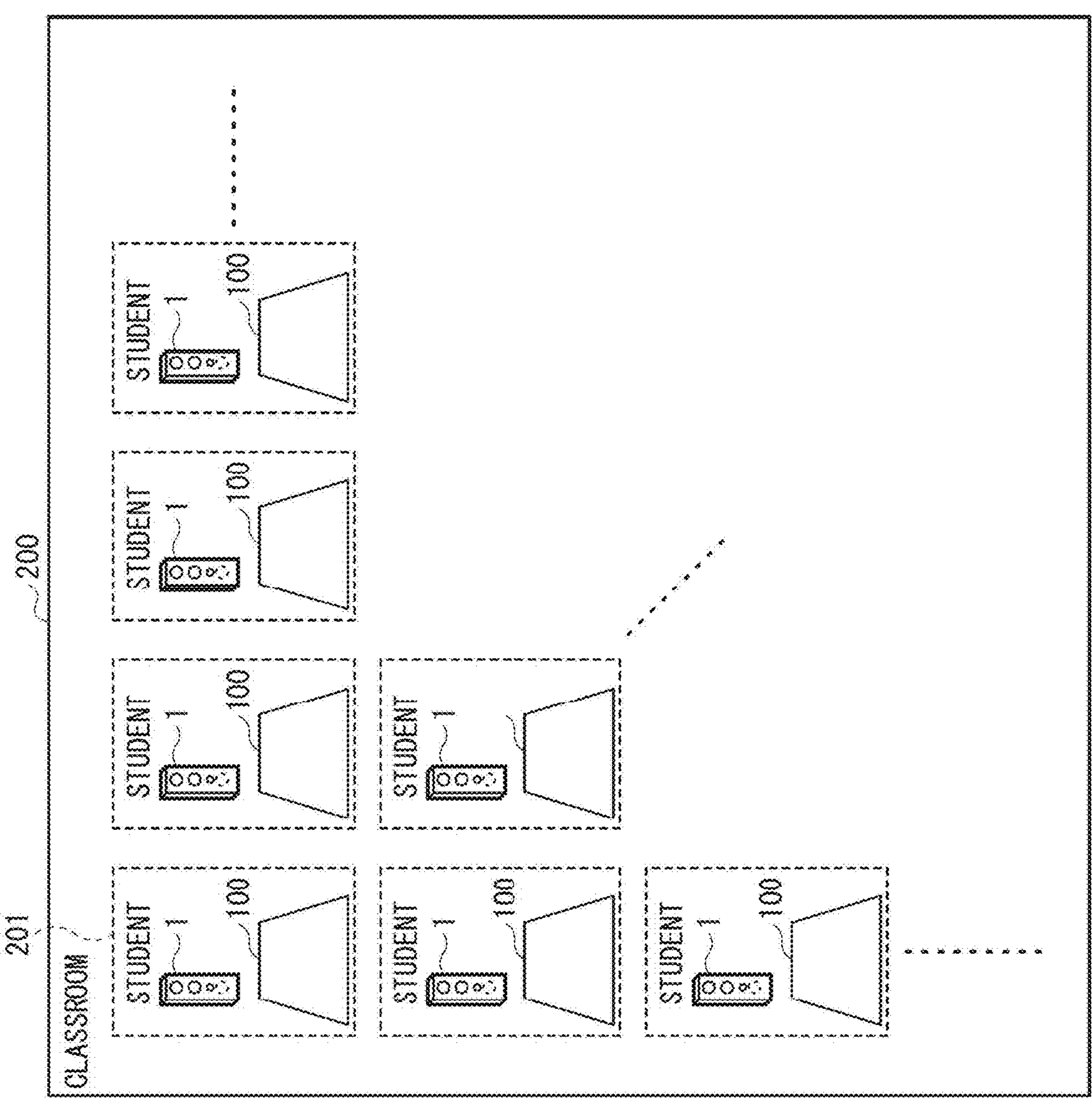
[FIG. 10]

[FIG. 11]
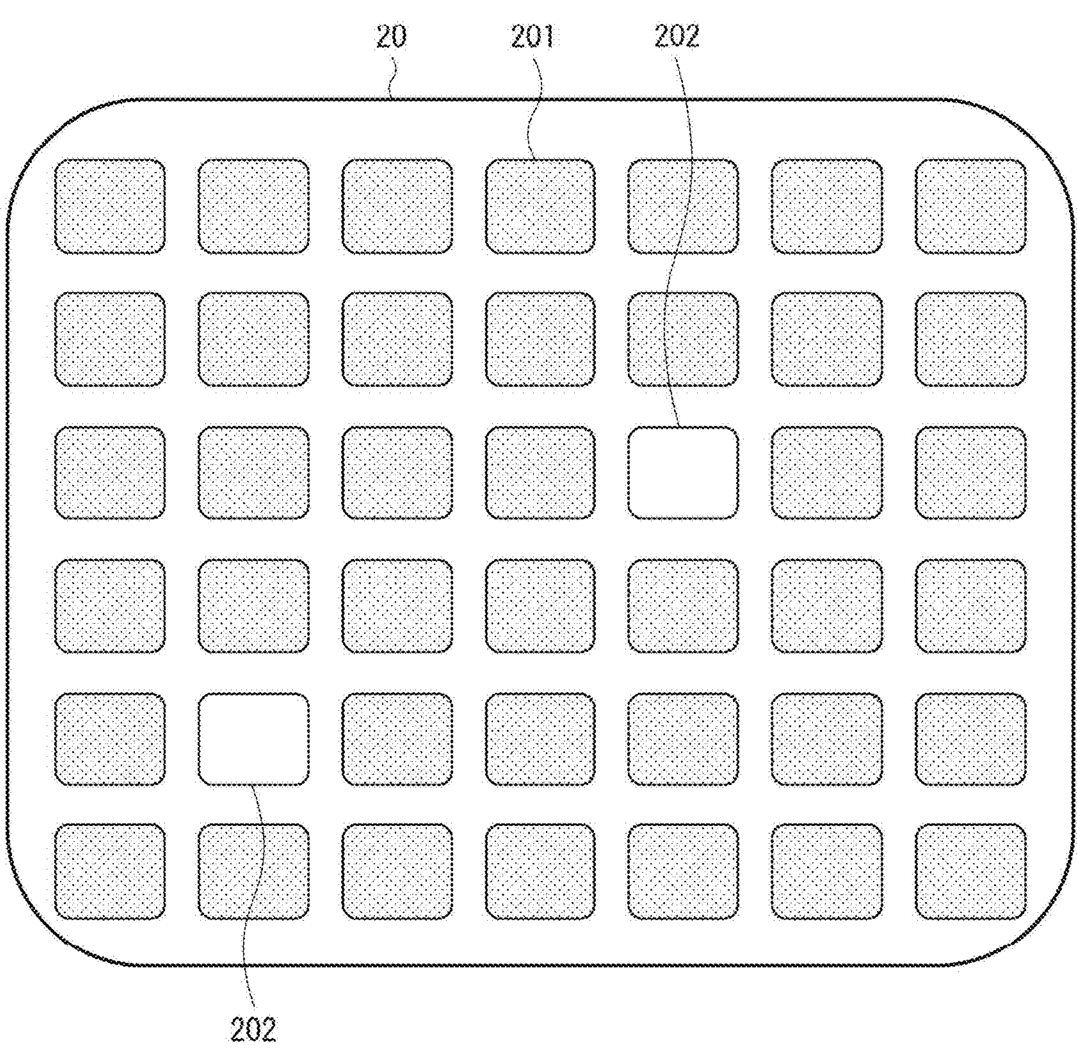

[FIG. 12]
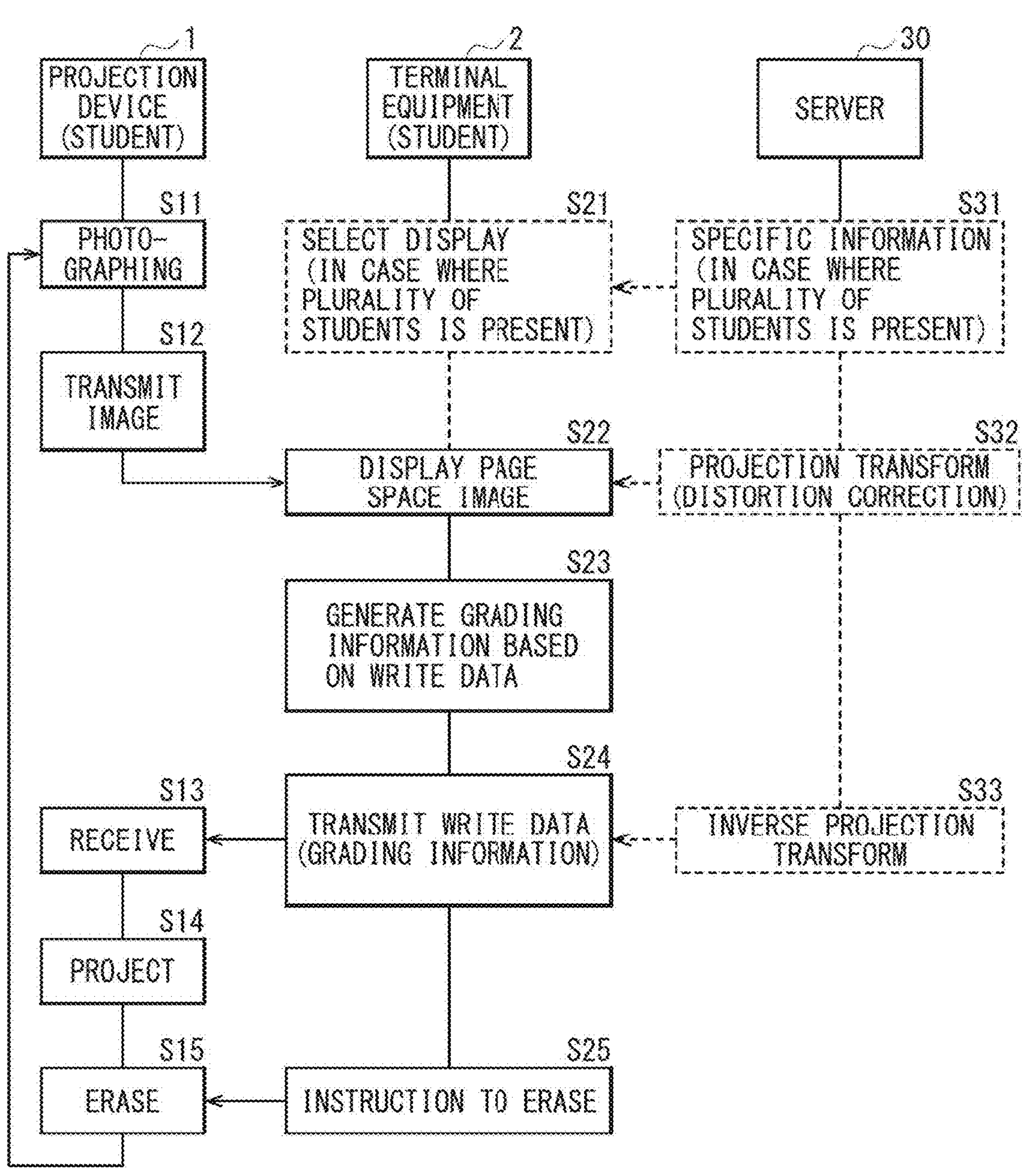

[FIG. 13]
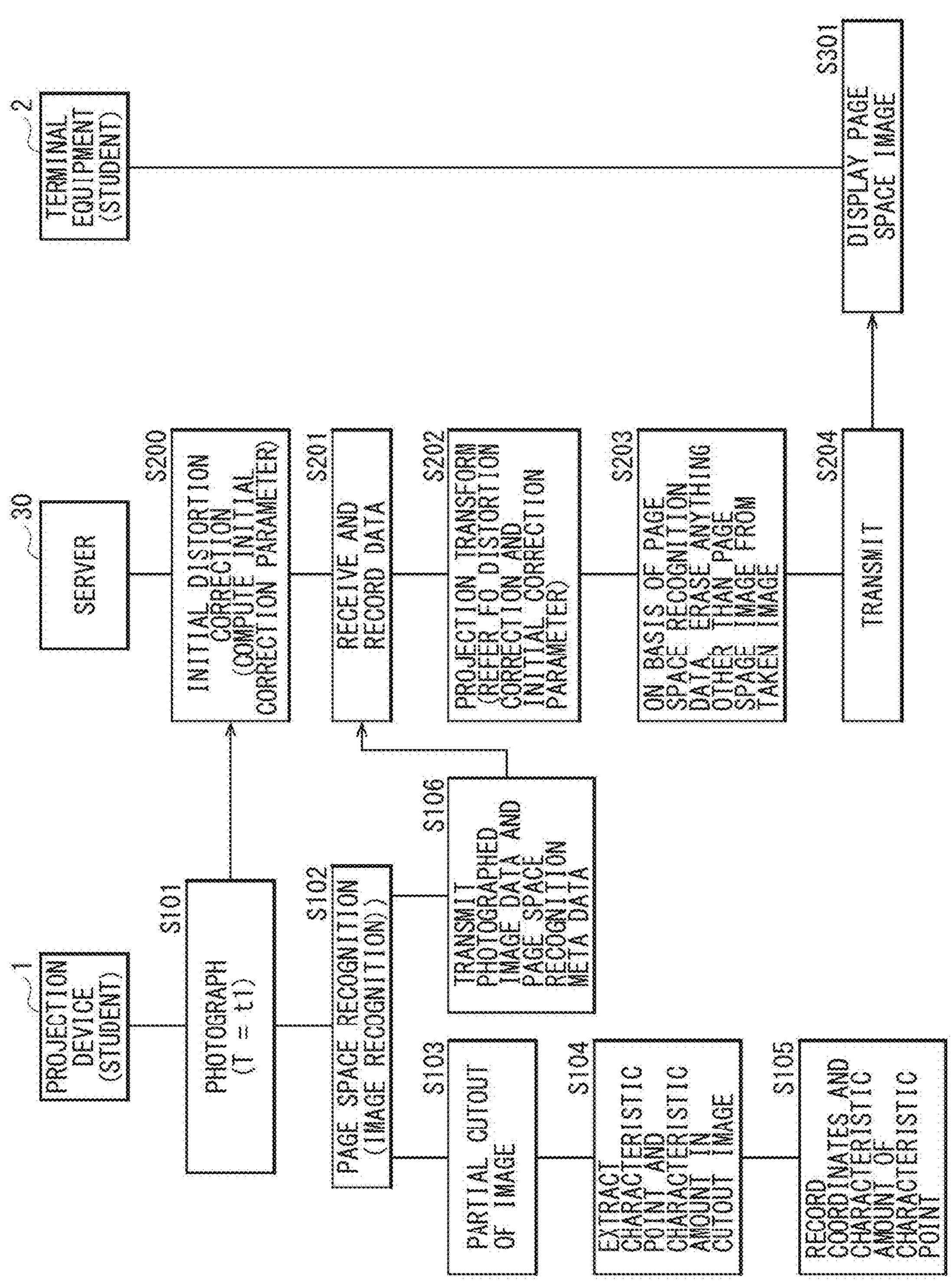

[FIG. 14]
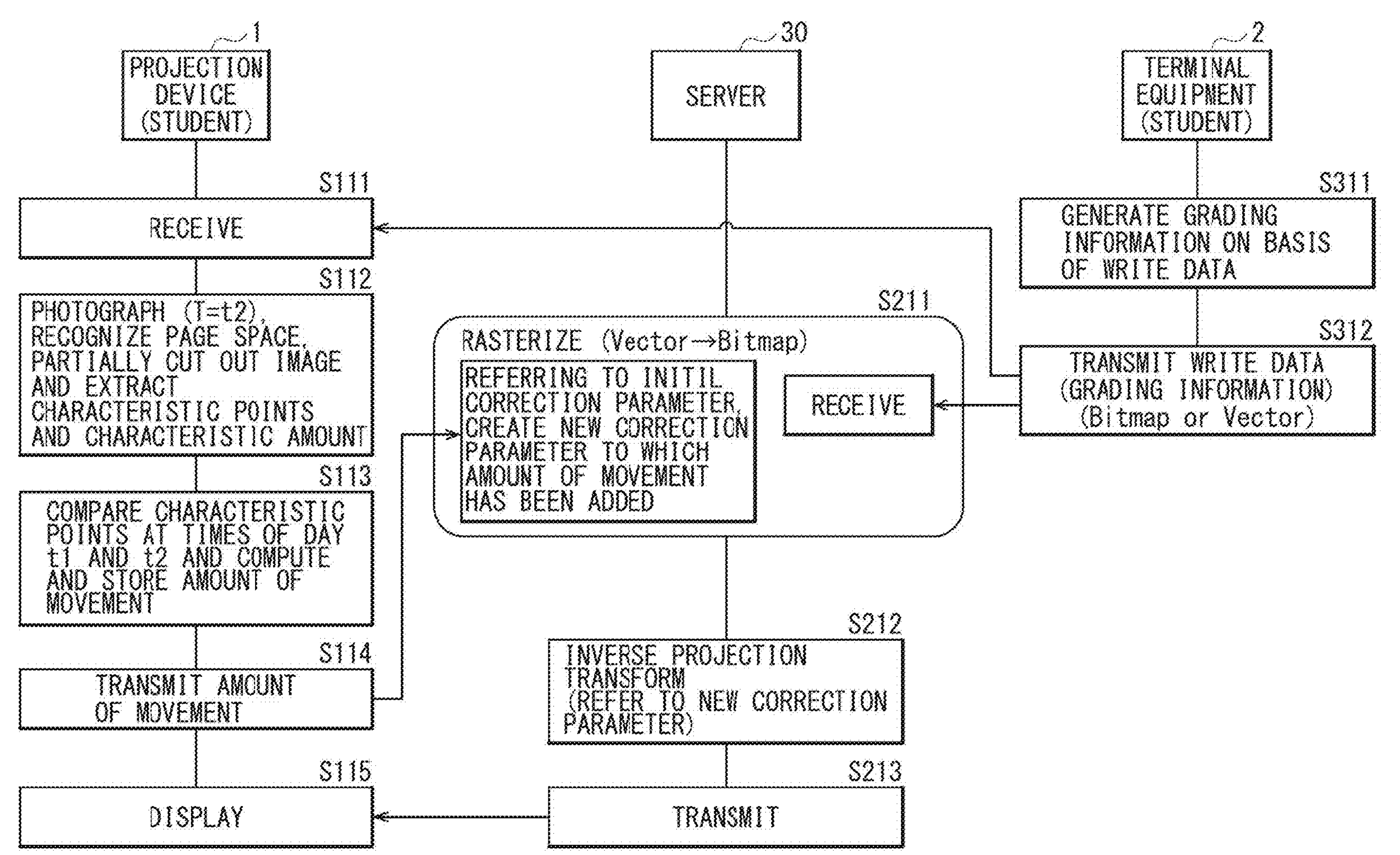

[FIG. 15]
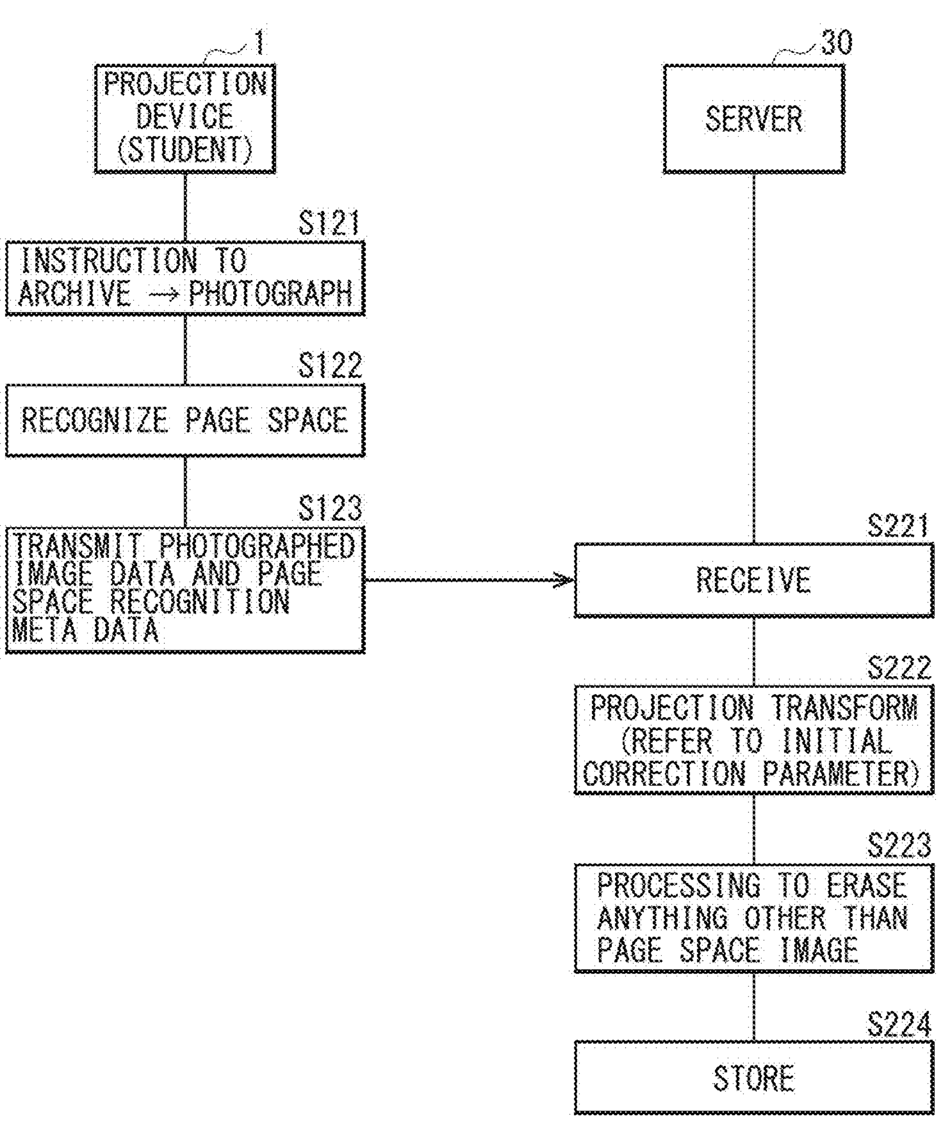

PROJECTION DEVICE AND IMAGE PROCESSING METHOD

CROSS REFERENCE TO RELATED APPLICATIONS

This application is a U.S. National Phase of International Patent Application No. PCT/JP2022/000802 filed on Jan. 12, 2022, which claims priority benefit of Japanese Patent Application No. JP 2021-013770 filed in the Japan Patent Office on Jan. 29, 2021. Each of the above-referenced applications is hereby incorporated herein by reference in its entirety.

TECHNICAL FIELD

The present disclosure relates to a projection device and an image processing system.

BACKGROUND ART

There is a system that photographs an answer sheet in which an answer is entered as guided information and that electronically performs grading (guidance) on the basis of the photographed image. Then, a system is proposed that projects a grading result as guiding information on the answer sheet (See PTLs 1 to 2).

CITATION LIST

Patent Literature

PTL 1: Japanese Unexamined Patent Application Publication No. 2015-1670001

PTL 2: Japanese Unexamined Patent Application Publication No. 2006-4010

SUMMARY OF THE INVENTION

In a case of real-time two-way guidance where, for example, an answering side (student side) receives real-time guidance from a grading side (teacher side), it is assumed that an answer sheet is moved while a student answers. In this case, it is difficult to appropriately project a grading result on the answer sheet.

It is desirable to provide a projection device that is able to appropriately project, on a sheet, guiding information for guided information entered on the sheet, and an image processing system.

A projection device according to an embodiment of the present disclosure includes a photographing unit that photographs a sheet on which guided information is entered at a plurality of times of day, the plurality of times of day including a first time of day and a second time of day being later than the first time of day; an image processing unit that extracts a partial characteristic amount of the sheet at the first time of day and a partial characteristic amount of the sheet at the second time of day to compute, at the second time of day, an amount of movement of the sheet from the first time of day; and a projection unit that projects guiding information for the guided information entered on the sheet, at a coordinate position to which the amount of movement of the sheet, computed by the image processing unit, has been added.

An image processing system according to an embodiment of the present disclosure includes an external device that generates guiding information for guided information entered on a sheet, on the basis of image data of the sheet on which the guided information is entered; and a projection device that projects, on the sheet, the guiding information generated by the external device, the projection device having:

- a photographing unit that photographs the sheet on which the guided information is entered at a plurality of times of day, the plurality of times of day including a first time of day and a second time of day being later than the first time of day;
- an image processing unit that extracts a partial characteristic amount of the sheet at the first time of day and a partial characteristic amount of the sheet at the second time of day to compute, at the second time of day, an amount of movement of the sheet from the first time of day; and
- a projection unit that projects the guiding information for the guided information entered on the sheet, at a coordinate position to which the amount of movement of the sheet, computed by the image processing unit, has been added.

The projection device or the image processing system according to the embodiment of the present disclosure projects the guiding information for the guided information entered on the sheet, at the coordinate position to which the amount of movement of the sheet has been added.

BRIEF DESCRIPTION OF DRAWINGS

FIG. 1 is a configuration diagram illustrating an overview of an image processing system according to a first embodiment of the present disclosure.

FIG. 2 is an explanatory diagram illustrating an example of a state in which the image processing system according to the first embodiment projects a grading result (grading information) on an answer sheet.

FIG. 3 is a block diagram schematically illustrating a configuration example of a projection device in the image processing system according to the first embodiment.

FIG. 4 is a block diagram schematically illustrating a configuration example of terminal equipment in the image processing system according to the first embodiment.

FIG. 5 is a block diagram schematically illustrating a configuration example of a server in the image processing system according to the first embodiment.

FIG. 6 is an explanatory diagram schematically illustrating an example of a projectable pixel count indication to be displayed on the terminal equipment.

FIGS. 7A and 7B are explanatory diagrams illustrating an overview of distortion correction in the image processing system according to the first embodiment.

FIG. 8 is an explanatory diagram schematically illustrating a configuration example of the answer sheet.

Figure 9:
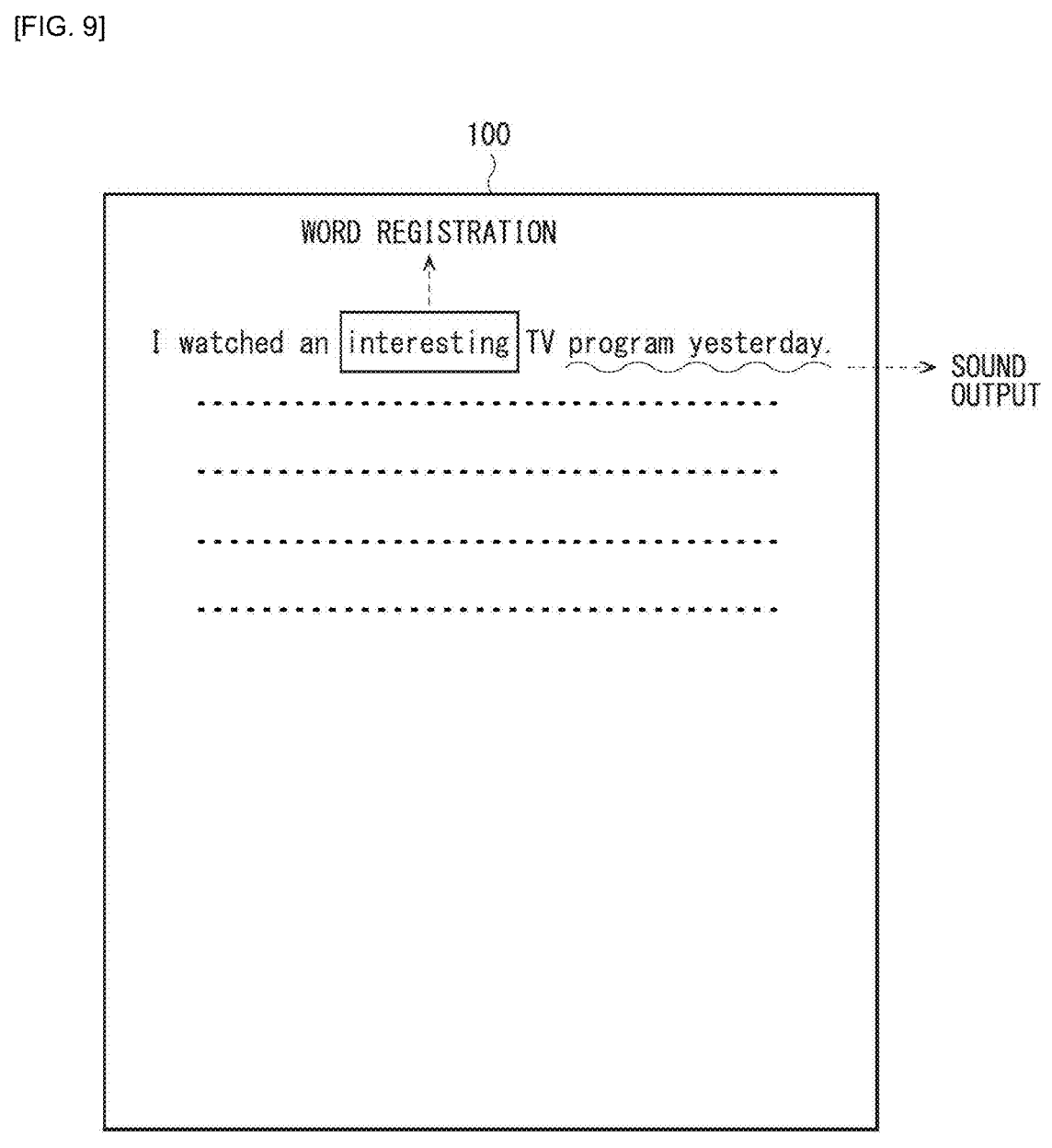

FIG. 9 is an explanatory diagram schematically illustrating an example of a command to be written on the answer sheet.

FIG. 10 is a configuration diagram schematically illustrating an example of a situation in which a plurality of projection devices (a plurality of students) is present.

FIG. 11 is an explanatory diagram schematically illustrating an example of a display state of the terminal equipment in a case where the plurality of projection devices (the plurality of students) is present.

FIG. 12 is a flowchart illustrating an example of a flow of an overall processing operation in the image processing system according to the first embodiment.

FIG. 13 is a flowchart illustrating an example of a flow of a processing operation until an image photographed by the projection device is displayed on the terminal equipment, in the image processing system according to the first embodiment.

FIG. 14 is a flowchart illustrating an example of a flow of the processing operation until the projection device projects the grading information generated by the terminal equipment.

FIG. 15 is a flowchart illustrating an example of a flow of the processing operation in a case where image data and the grading information of the answer sheet are archived, in the image processing system according to the first embodiment.

MODES FOR CARRYING OUT THE INVENTION

In the following, some embodiments of the present disclosure are described in detail with reference to the drawings. It is to be noted that description is given in the following order:

1. First Embodiment (FIG. 1 to FIG. 15)
   - 1.1 Configuration
   - 1.2 Operation
   - 1.3 Effects
2. Other Embodiments

1. First Embodiment

[1.1 Configuration]

(Overview of Image Processing System)

FIG. 1 illustrates an overview of an image processing system according to a first embodiment of the present disclosure.

The image processing system according to the first embodiment includes a projection device 1, terminal equipment 2, and a server 30. The server 30 is provided on a cloud 3, for example. The terminal equipment 2 and the server 30 are external devices to the projection device 1. The projection device 1, the terminal equipment 2, and the server 30 are able to communicate with each other wirelessly or by wire.

The projection device 1 has a projection unit 10, a photographing unit 11, a microphone 51, and a speaker 52.

The terminal equipment 2 has a display unit 20, a microphone 71, and a speaker 72. The display 20 includes a touch panel, for example. The terminal equipment 2 is able to receive operation input by an input device 4 such as a touch pen, on a screen of the display unit 20.

The projection device 1 is disposed on side of a student who is a guidance target (grading target). The terminal equipment 2 is disposed on side of a teacher who performs guidance (grading). In addition, this imaging processing system allows the guidance (grading) to be performed by humans (teachers) and the guidance (grading) to be performed by using an AI (artificial intelligence) on side of the server 30.

In addition, this image processing system allows the student to receive audio guidance from the teacher, because the projection device 1 has the microphone 51 and the speaker 52, and the terminal equipment 2 has the microphone 71 and the speaker 72. Further, this image processing system makes it possible to send and receive sound data between the projection device 1 and the server 30, thus allowing the student to receive the audio guidance from the AI.

In this image processing system, the student enters an answer to a question stated in an answer sheet 100 as guided information. Then, the photographing unit 11 of the projection device 1 photographs the answer sheet 100. Image data of the answer sheet 100 photographed by the photographing unit 11 is transmitted to the server 30 and the terminal equipment 2 as the external devices. On the basis of the image data of the answer sheet 100, the server 30 or the terminal equipment 2 generates grading information as guiding information for the answer entered on the answer sheet 100, and transmits the grading information to the projection device 1. The generation of the grading information by the server 30 is performed by the AI. The generation of the grading information is performed by the terminal equipment 2 on the basis of writing by the teacher using the input device 4 on the screen of the display unit 20 displaying the image of the answer sheet 100.

It is to be noted that the grading information as the guiding information may include a result of a simple correct/incorrect determination on the answer and information for leading to the answer such as an explanation about the question, or the like. In addition, in this image processing system, the guidance target may not be limited to the guidance where the grading is performed, such as English or mathematics, but may be the guidance where the grading is not performed, for example, the guidance on painting (such as the guidance on how to draw or on a coloring book) or the guidance on stroke order of kanji characters. Furthermore, the guidance target may not be limited to the guidance such as school education, and may be the guidance on hobbies such as a game of Go or Japanese chess. The projection device 1 projects the grading information on the answer sheet 100 by the projection unit 10, the grading information being generated by the server 30 or the terminal equipment 2.

FIG. 2 illustrates an example of a state in which the image processing system according to the first embodiment projects a grading result (grading information) on the answer sheet 100.

It is preferable that a range of photographing by the photographing unit 11 be larger than a projection range 110 by the projection unit 10. For this reason, it is preferable that the photographing unit 11 be disposed above the projection unit 10.

At a first time of day T=t1 (FIG. 1), the photographing unit 11 of the projection device 1 performs photographing to transmit the image data of the answer sheet 100. The photographing unit 11 also photographs the answer sheet 100 at a second time of day T=t2 (FIG. 2). At the second time of day T=T2, the projection device 1 computes an amount of movement of the answer sheet 100 from the first time of day T=t1. The projection unit 10 projects the grading information at a coordinate position to which the computed amount of movement of the answer sheet 100 has been added. This makes it possible to appropriately project the grading information on the answer sheet 100, even though the answer sheet 100 moves in a period from the first time of day T=t1 until a time of day when the grading information is projected.

[Configuration of Projection Device 1]

FIG. 3 schematically illustrates a configuration example of the projection device 1 in the image processing system according to the first embodiment.

The projection device 1 includes the projection unit 10, the photographing unit 11, an image processing unit 12, a control unit 13, a storage unit 14, an operation input unit 15, a talking unit 50, and a communication unit 60.

The projection device 1 may have a microcomputer with a CPU (Central Processing Unit), a ROM (Read Only Memory), and a RAM (Random Access Memory), for example. In this case, by the CPU performing processing based on a program stored in the ROM or the RAM, it may be possible to implement processing by, for example, the image processing unit 12 and the control unit 13 in the projection device 1. The processing by the image processing unit 12 and the control unit 13 may also be implemented, by the CPU performing processing based on a program supplied from outside by, for example, a wired or wireless network.

It is to be noted that the photographing unit 11 may have a function corresponding to the processing performed by the image processing unit 12.

The photographing unit 11 photographs the answer sheet 100 on which the answer is entered at a plurality of times of day, the plurality of times of day including the first time of day T=t1 and the second time of day T=t2 being later than the first time of day T=t1. In addition, in order to compute in advance a correction parameter to be used in distortion correction of, for example, photographed images and projected images, the photographing unit 11 photographs the answer sheet 10 before the answer is entered, or a predetermined pattern image for distortion correction, the predetermined pattern image being projected by the projection unit 10.

The image processing unit 12 has a characteristic amount extraction section 121. By the characteristic amount extraction section 121, the image processing unit 12 extracts a partial characteristic amount of the answer sheet 100 at the first time of day T=t1 and a partial characteristic amount of the answer sheet 100 at the second time of day T=t2. On the basis of the partial characteristic amounts extracted by the characteristic amount extraction section 121, the image processing unit 12 computes, at the second time of day T=t2, the amount of movement of the answer sheet 100 from the first time of day T=t1.

The storage unit 34 stores the partial characteristic amounts extracted by the characteristic amount extraction section 121.

The projection unit 10 projects the grading information for the answer entered on the answer sheet 100, at the coordinate position to which the amount of movement of the answer sheet 100 computed by the image processing unit 12 has been added. In addition, the projection unit 10 projects the predetermined pattern image for distortion correction, to compute in advance the correction parameter to be used in the distortion correction of, for example, the photographed images and the projected images.

The talking unit 50 has the microphone 51 and the speaker 52 as a sound output unit.

The communication unit 60 has a receiving unit 61 and a transmitting unit 62. The communication unit 60 performs transmission and reception of various types of data wirelessly or by wire between the terminal equipment 2 and the server 30. The transmitting unit 62 transmits, to an external device, the image data of the answer sheet 100 photographed by the photographing unit 11, sound data inputted from the microphone 51, or the like, for example. The receiving unit 61 receives the grading information that is generated in the external device on the basis of the image data of the answer sheet 100, or the sound data from the external device, or the like.

The operation input unit 15 has an archive instruction receiving section 151. The operation input unit 15 receives various types of operation inputs from a student who is a user. The archive instruction receiving section 151 is a receiving section that receives an instruction for causing the external device to store (archive), for example, the image data of the answer sheet 100 and the grading information. In a case where the archive instruction receiving section 151 receives an instruction to archive, the archive instruction receiving section 151 transmits an instruction command to archive via the transmission unit 62 to the external device.

[Configuration of Terminal Equipment 2]

FIG. 4 schematically illustrates a configuration example of the terminal equipment 2 in the image processing system according to the first embodiment.

The terminal equipment 2 includes the display unit 20, an image processing unit 22, a control unit 23, a storage unit 24, an operation input unit 25, a guidance mode notifying unit 26, a displayable pixel count computing unit 27, a talking unit 70, and a communication unit 80.

The terminal equipment 2 may have the microcomputer with the CPU, the ROM, and the RAM, for example. In this case, by the CPU performing the processing based on the program stored in the ROM or the RAM, it may be possible to implement processing by, for example, the image processing unit 22, the control unit 23, the guidance mode notifying unit 26, and the displayable pixel count computing unit 27 in the terminal equipment 2. The processing by the image processing unit 22, the control unit 23, the guidance mode notifying unit 26, and the displayable pixel count computing unit 27 may also be implemented, by the CPU performing the processing based on the program supplied from the outside by, for example, the wired or wireless network.

The display unit 20 includes a touch panel, for example, and displays the image of the answer sheet 10 photographed by the photographing unit 11 of the projection device 1. As illustrated in FIG. 7B to be described below, the image of the answer sheet 100 to be displayed on the display unit 20 is an image after the server 30 performs the distortion correction.

The operation input unit 25 has a grading information input section 251 as a guiding information input section. The grading information input section 251 receives operation input by the input device 4 (FIG. 1) such as a touch pen on the screen of the display unit 20 and generates write data for generating the grading information. The teacher operating the terminal equipment 2 is able to use the input device 4 to perform input for generating the grading information, on the basis of the image of the answer sheet 100 after being distortion-corrected, the image being displayed on the display 20.

The image processing unit 12 generates the grading information on the basis of the write data generated by the operation input unit 25.

As illustrated in FIG. 10 and FIG. 11 to be described below, this image processing system makes it possible to guide a plurality of students 201 (a plurality of projection devices 1). The guidance mode notifying unit 26 is a notifying unit that notifies a specific student 202 (specific projection device 1) that the student 202 is a guidance target. The notification by the guidance mode notifying unit 26 is performed via the talking unit 70 or the communication unit 80.

The displayable pixel count computing unit 27 is a computing unit that computes information regarding the displayable (projectable) pixel count in the projection device 1 and causes the computed pixel count information to be displayed on the display unit 20.

FIG. 6 schematically illustrates an example of a projectable pixel count indication 300 to be displayed on the terminal equipment 2. For example, as illustrated in FIG. 6, the displayable pixel count computing unit 27 determines an upper limit of the displayable (projectable) pixel count in advance in the projection device 1, and causes the projectable pixel count indication 300 to be performed. The projectable pixel count indication 300 reduces the displayable (projectable) pixel count as the grading information is written. Determination of the upper limit of the displayable (projectable) pixel count in the projection device 1 makes it possible to suppress power consumption of the projection device 1.

The talking unit 70 has the microphone 71 and the speaker 72.

The communication unit 80 has a receiving unit 81 and a transmitting unit 82. The communication unit 80 performs transmission and reception of various types of data wirelessly or by wire between the projection device 1 and the server 30. The transmitting unit 82 transmits to the projection device 1 or the server 30 the grading information generated by the image processing unit 12 or the sound data inputted from the microphone 71, or the like, for example. The receiving unit 81 receives the image data of the answer sheet 100 from the projection device 1 or the server 30 or the sound data from the projection device 1, or the like, for example.

[Configuration of Server 30]

FIG. 5 schematically illustrates a configuration example of the server 30 in the image processing system according to the first embodiment.

The server 30 includes an image processing unit 32, a control unit 33, a storage unit 34, a command processing unit 35, a grading information generating unit 36, a guidance target identifying unit 37, a command recognizing unit 38, and a communication unit 90.

The server 30 may have the microcomputer with the CPU, the ROM, and the RAM, for example. In this case, by the CPU performing the processing based on the program stored in the ROM or the RAM, it may be possible to implement processing by, for example, the image processing unit 32, the control unit 33, the command processing unit 35, the grading information generating unit 36, the guidance target identifying unit 37, and the command recognizing unit 38 in the server 30. The processing by the image processing unit 32, the control unit 33, the command processing unit 35, the grading information generating unit 36, the guidance target identifying unit 37, and the command recognizing unit 38 may also be implemented, by the CPU performing the processing based on the program supplied from the outside by, for example, the wired or wireless network.

The image processing unit 32 has a distortion correcting section 321.

The communication unit 90 has a receiving unit 91 and a transmitting unit 92.

The distortion correcting section 321 performs the distortion correction of the image data of the answer sheet 100 photographed by the photographing unit 11 of the projection device 1.

The grading information generating unit 36 generates the grading information using the AI, on the basis of the image data of the answer sheet 100 after being distortion-corrected by the distortion correcting section 321.

FIGS. 7A and 7B illustrate an overview of the distortion correction in the image processing system according to the first embodiment.

The image processing system performs initial distortion correction processing in advance. In the image processing system, the projection unit 10 of the projection device 1 performs projection of the predetermined pattern image for distortion correction. The photographing unit 11 of the projection device 1 photographs the predetermined pattern image for distortion correction. FIG. 7A illustrates an example of the predetermined pattern image for distortion correction (pattern image viewed from the photographing unit 11) projected by the projection unit 10 of the projection device 1. The transmitting unit 62 of the projection device 1 transmits data of the predetermined pattern image photographed by the photographing unit 11 to the server 30. The distortion correcting section 321 of the server 30 corrects distortion by performing predetermined projection transform on the data of the predetermined pattern image. FIG. 7B illustrates an example of the pattern image after being distortion-corrected.

The distortion correcting section 321 stores a transform parameter of the projection transform, or the like, which is used when performing the foregoing initial distortion correction processing, as an initial distortion correction parameter, in the storage unit 34. This allows the server 30 to subsequently use the initial distortion correction parameter to perform the distortion correction of the image data of the answer sheet 100 from the projection device 1. The transmitting unit 92 of the server 30 transmits the image data of the answer sheet 100 after being distortion-corrected to the terminal equipment 2. This allows the terminal equipment 2 to display the distortion-corrected image of the answer sheet 100 to the display unit 20.

In contrast, in a case where the projection unit 10 of the projection device 1 is caused to project the grading information generated in the terminal equipment 2 or the server 30, the distortion correcting section 321 performs inverse distortion correction through, for example, inverse projection transform on the image data of the grading information. This allows the projection unit 10 of the projection device 1 to project the grading information at an appropriate coordinate position. For example, in a case where the display unit 20 of the terminal equipment 2 points out a position at X=3 and Y=3 in XY coordinates after being distortion-corrected as illustrated in FIG. 7B, the projection device 1 illustrated in FIG. 7A is able to provide a point representation at the coordinate position corresponding to X=3 and Y=3.

The storage unit 34 stores, for example, the foregoing initial distortion correction parameter or various types of data based on command processing by the command processing unit 35.

The command recognizing unit 38 performs recognition of various types of commands transmitted from the projection device 1. The command recognizing unit 38 recognizes, for example, the instruction command to archive or a command inputted on the answer sheet 100.

In a case where the command recognized by the command recognizing unit 38 is the instruction command to archive, the command processing unit 35 stores the image data of the answer sheet 100 and the grading information in the storage unit 34. In a case where the command recognized by the command recognizing unit 38 is the instruction command to archive, for example, first data or third data as described below is stored. By storing the first data or the third data as described below, for example, the student is able to confirm understanding of the guidance, or the like, later. It is to be noted that only the first data may be archived.

First data: The image data of the answer sheet 100 before the grading information is projected (before the guidance is received) and the grading information Second data: The image data of the answer sheet 100 after the grading information is projected (after the guidance is received) and the grading information Third data: The image data of the answer sheet 100 after the grading information is projected (after the guidance is received)

FIG. 8 schematically illustrates a configuration example of the answer sheet 100.

The answer sheet 100 may include a question-and-answer writing region 101, and a command information display region 102. The command information display region 102 is a region where command information is written. The range of photographing by the photographing unit 11 may be a region including the question-and-answer writing region 101 and the command information display region 102. The projection range 110 by the projection unit 10 may be a region including the question-and-answer writing region 101. The command recognizing unit 38 recognizes from an image that an operation to point out a command written in the command information display region 102 has been performed in the projection device 1, and identifies the command. The command processing unit 35 performs processing in accordance with the identified command.

The command recognizing unit 38 also recognizes that the writing indicating the command has been performed in the question-and-answer writing region 101 of the answer sheet 100.

FIG. 9 schematically illustrates an example of a command to be written on the answer sheet 100.

In a case where questions in a story format such as English are written, for example, and there is a writing that encloses a sentence in a square, the command recognizing unit 38 recognizes that the writing is a command to instruct registration of words (character information) in the region enclosed by the square. On the basis of a recognition result of the command recognizing unit 38, the command processing unit 35 stores data of the words in the region enclosed by the square in the storage unit 34.

In addition, in a case where the questions in the story format such as English are written, and there is a writing such as an underline drawn along a sentence, the command recognizing unit 38 recognizes that the writing is a command to instruct sound output of words (character information) of an underlined part. On the basis of the recognition result of the command recognizing unit 38, the command processing unit 35 instructs the projection device 1 to output sound corresponding to the character information on the answer sheet 100 as instructed by the command.

[Guidance for a Plurality of Students]

This image processing system makes it possible to guide a plurality of students (plurality of projection devices 1).

FIG. 10 schematically illustrates an example of a situation in which the plurality of projection devices 1 (plurality of students) is present. FIG. 11 schematically illustrates an example of a display state of the terminal equipment 2 in a case where the plurality of projection devices 1 (plurality of students) is present.

As illustrated in FIG. 10, in a case where a plurality of students 201 is present in a classroom 200, each of the projection devices 1 is disposed for each of the students 201. In such a case, it is difficult for the teacher to simultaneously look at respective answer sheets 100 of all the students 201 through the terminal equipment 2 and simultaneously perform the guidance (grading) for all the students 201. As such, the terminal equipment 2 first simplifies and displays images corresponding to the answer sheets 100 of the plurality of students 201 on the display unit 20. Then, the teacher performs the guidance (grading) only for the specific student 202 who is the guidance target. In the terminal equipment 2, in a case where, for example, an action is performed of tapping a display region corresponding to the answer sheet 100 of the specific student 202 on the screen of the display unit 20, an image of the answer sheet 100 photographed by the specific projection device 1 disposed at the specific student 202 is enlarged and displayed on the display unit 20. This allows the teacher to generate the grading information for the answer written on the answer sheet 100 of the specific student 202.

On the basis of the image data of each of the answer sheets 100 from each of the plurality of projection devices 1, the guidance target identifying unit 37 of the server 30 identifies one or more projection devices 1 taking an image of the answer sheet 100 which is the guidance target. The guidance target identifying unit 37 notifies the terminal equipment 2 of information regarding that specific projection device 1 (specific student 202) via the transmitting unit 92. Here, examples of the guidance targets include a case in which an answer has a mistake, or a case in which it takes time to fill in an answer. On the basis of the information regarding the specific projection device 1 from the server 30, the terminal equipment 2 varies the display state of the display region corresponding to the answer sheet 100 of the specific student 202 on the screen of the display unit 20. For example, a display color is changed or a display is blinked. The terminal equipment 2 generates the grading information for the answer entered on the answer sheet 100. The answer sheet 100 is photographed by the specific projection device 1 identified by the guidance target identifying unit 37. In addition, the guidance mode notifying unit 26 of the terminal equipment 2 notifies the specific projection device 1 that the specific projection device 1 is the guidance target. The notification by the guidance mode notifying unit 26 is performed through the talking unit 70 or the communication unit 80.

[1.2 Operation]

FIG. 12 is a flowchart illustrating an example of a flow of an overall processing operation in the image processing system according to the first embodiment.

First, the projection device 1 photographs the answer sheet 100 by the photographing unit 11 (step S11). Next, the projection unit 1 transmits data of the image of the answer sheet 100 photographed by the photographing unit 11 (step S12). The terminal equipment 2 displays a page space image based on the image data of the answer sheet 100 photographed by the photographing unit 11 (step S22). At this time, the terminal equipment 2 displays the page space image based on the image data of the answer sheet 100 after the projection transform (distortion correction) has been performed in the server 30 (Step S32).

It is to be noted that in a case where the plurality of students 201 (plurality of projection devices 1) is present, the terminal equipment 2 selects whether or not to display a page space image based on the image data of the answer sheet 100 photographed by any projection device 1 of the plurality of projection devices 1 (step S21). The guidance target identifying unit 37 of the server 30 identifies one or more projection devices 1 taking an image of the answer sheet 100 which is the guidance target, and notifies the terminal equipment 2 of information regarding the specific projection device 1 (specific student 202) via the transmitting unit 92 (step S31). On the basis of the information regarding the specific projection device 1, the terminal equipment 2 selects whether or not to display the page space image based on the image data of the answer sheet 100 photographed by any projection device 1.

The terminal equipment 2 generates grading information on the basis of the write data using the input device 4, for example (step S23). Next, the terminal equipment 2 transmits the grading information generated on the basis of the write data (step S24). The server 30 performs the inverse distortion correction on the image data of the grading information, through the inverse projection transform, for example (step S33). The projection device 1 receives the grading information after the inverse distortion correction has been performed (step S13), and projects that grading information on the answer sheet 100 (step S14). In a case where there is an instruction from the terminal equipment 2 to erase the grading information (step S25), the projection device 1 erases the grading information from the image being projected (step S15) and returns to processing of step S11.

FIG. 13 is a flowchart illustrating an example of a flow of a processing operation until the image photographed by the projection device 1 is displayed on the terminal equipment 2, in the image processing system according to the first embodiment.

First, the projection device 1 performs photographing with the photographing unit 11 (step S101). It is to be noted that the photographing unit 11 may photograph the predetermined pattern image for distortion correction projected by the projection unit 10 in advance. On the basis of the data of the predetermined pattern image photographed by the photographing unit 11, the server 30 performs the initial distortion correction processing to compute the initial distortion correction parameter (step S200).

Next, the image processing unit 12 of the projection device 1 performs page space image recognition (image recognition) processing of the answer sheet 100 in the image photographed by the photographing unit 11 (step S102). Then, the image processing unit 12 transmits the image data photographed by the photographing unit 11 and page space recognition meta data of the answer sheet 100 (step S106). In parallel with this, the image processing unit 12 of the projection device 1 performs processing of computing the partial characteristic amount of the image region corresponding to the answer sheet 100, on the photographed image photographed by the photographing unit 11 at the first time of day T=t1. As the processing of computing the characteristic amount, the image processing unit 12 of the projection device 1 first performs a partial cutout of the photographed image photographed by the photographing unit 11 at the first time of day T=t1 (step S103). The partial cutout is performed by cutting out, for example, rectangular regions at two or more locations in the image region corresponding to the answer sheet 100. Next, the image processing unit 12 extracts a characteristic point in the cutout image and the characteristic amount (step S104). Then, the image processing unit 12 stores coordinate data and characteristic amount data of the extracted characteristic point in the storage unit 14 (step S105). It is to be noted that a case is assumed in which the answer sheet 100 is blank, such as a case in which the guidance on painting is provided, for example. A recognition marker may be written on the answer sheet 100 to recognize the answer sheet 100.

The server 20 receives the photographed image data from the projection device 1 and the page space recognition meta data of the answer sheet 100 (step S201). Next, the image processing unit 32 of the server 20 refers to the initial distortion correction parameter computed in advance, and performs the projection transform (distortion correction) on the photographed image data (step s202). Then, on the basis of the page space recognition meta data, the image processing unit 32 performs processing of erasing from the photographed image any image other than the page space corresponding to the answer sheet 100 (step S203). Subsequently, the server 20 transmits the data of the page space image corresponding to the answer sheet 100 to the terminal equipment 2 (step S204). The terminal equipment 2 displays the page space image corresponding to the answer sheet 100 (step S301).

FIG. 14 is a flowchart illustrating an example of a flow of the processing operation until the grading information generated by the terminal equipment 2 is projected by the projection device 1, in the image processing system according to the embodiment in FIG. 1.

First, in the terminal equipment 2, the teacher performs writing with the input device 4 on the screen of the display unit 20 on which the page space image of the answer sheet 100 is displayed. The terminal equipment 2 generates the grading information on the basis of the write data (step S311). Next, the terminal equipment 2 transmits the grading information generated on the basis of that write data (step S312). The data of the grading information to be transmitted here may be, for example, image data such as bitmap data or vector data.

The projection device 1 receives the data of the grading information (step S111). Next, the image processing unit 12 of the projection device 1 performs processing of computing the partial characteristic amount of the image region corresponding to the answer sheet 100, on the photographed image photographed by the photographing unit 11 at the second time of day T=t2 (step S112). As the processing of computing the characteristic amount, the image processing unit 12 of the projection device 1 first performs the partial cutout of the photographed image photographed by the photographing unit 11 at the second time of day T=t2. The partial cutout is performed by cutting out, for example, rectangular regions at two or more locations in the image region corresponding to the answer sheet 100. Next, the image processing unit 12 extracts the characteristic point in the cutout image and the characteristic amount. Then, the image processing unit 12 stores the coordinate data and the characteristic amount data of the extracted characteristic point in the storage unit 14. Subsequently, the image processing unit 12 compares the partial characteristic amount of the answer sheet 100 at the first time of day T=t1 with the partial characteristic amount of the answer sheet 100 at the second time of day T=t2. On the basis of a result of the comparison, the image processing unit 12 computes, at the second time of day T=t2, the amount of movement of the answer sheet 100 from the first time of day T=t1, and stores the amount of movement in the storage unit 14 (step S113). Then, the image processing unit 12 transmits the computed amount of the movement of the answer sheet 100 (step S114).

At the same time, the server 30 receives the data of the grading information from the terminal equipment 2 (step S211). In a case where the image data of the grading information is the vector data, the image processing unit 32 of the server 30 performs rasterization of the vector data into bitmap data. In addition, the server 30 receives the amount of movement of the answer sheet 100 from the projection device 1 in step S211. Referring to an initial correction parameter, the image processing unit 32 of the server 30 creates a new correction parameter to which the amount of movement of the answer sheet 100 has been added. Next, referring to the new correction parameter, the image processing unit 32 of the server 30 performs the inverse distortion correction on the image data of the grading information, through the inverse projection transform, for example (step S212). The server 30 transmits the image data of the grading information after the inverse distortion correction to the projection device 1 (step S213). The projection device 1 projects and displays the image data of the grading information from the server 30, on the answer sheet 100 (step S115).

It is to be noted that by causing the processing from the foregoing steps S112 to S115 and steps S211 to S213 to loop, it is possible to cause continuous projection and display of the grading information to be displayed at an appropriate coordinate position on the answer sheet 100 even in a case the answer sheet 100 has moved.

FIG. 15 is a flowchart illustrating an example of a flow of the processing operation in a case where the image data and the grading information of the answer sheet 100 are archived, in the image processing system according to the embodiment in FIG. 1.

In the projection device 1, in a case where the archive instruction receiving section 151 receives an instruction to archive, the photographing unit 11 performs photographing (step S121). The image processing unit 12 of the projection device 1 performs the page space image recognition (image recognition) processing of the answer sheet 100 in the photographed image by the photographing unit 11 (step S122). Next, the image processing unit 12 transmits the data of the image photographed by the photographing unit 11 and the page space recognition meta data of the answer sheet 100 (step S123).

The server 20 receives the photographed image data from the projection device 1 and the page space recognition meta data of the answer sheet 100 (step S221). Next, the image processing unit 32 of the server 20 refers to the initial distortion correction parameter computed in advance, and performs the projection transform (distortion correction) on the photographed image data (step S222). Then, on the basis of the page space recognition meta data, the image processing unit 32 performs the processing of erasing from the photographed image any image other than the page space corresponding to the answer sheet 100 (step S223). Subsequently, the image processing unit 32 stores the data of the page space image corresponding to the answer sheet 100 in the storage unit 34 (step S223).

It is to be noted that as described above, in the server 20, day to be stored in the storage unit 34 in a case where the instruction to archive is received may be first data or third data as described below:

First data: The image data and the grading information of the answer sheet 100 before the grading information is projected (before the guidance is received)

Second data: The image data and the grading information of the answer sheet 100 after the grading information is projected (after the guidance is received)

Third data: The image data of the answer sheet 100 after the grading information is projected (after the guidance is received)

[1.3 Effects]

As described above, according to the projection device 1 and the image processing system according to the first embodiment, the grading information as the guiding information for the answer entered on the answer sheet 100 as the guided information is projected on the coordinate position to which the amount of movement of the answer sheet 100 has been added. This makes it possible to appropriately project, on the answer sheet 100, the grading information for the answer entered on the answer sheet 100. Consequently, even in a case where the answer sheet 100 moves, it is possible to appropriately project the grading information real time, following the movement of the answer sheet 100.

It is to be noted that the effects described herein are merely illustrative and non-limiting, and may further include other effects. This also applies to the effects of other embodiments hereinafter.

2. Other Embodiments

The technology according to the present disclosure is not limited to the respective embodiments described above and a variety of modifications is possible.

For example, the present technology may take a configuration as described below.

According to the present technology of the following configuration, guiding information for guided information entered on a sheet is projected at a coordinate position to which an amount of movement of the sheet has been added. This makes it possible to appropriately project the guiding information for the guided information entered on the sheet.

(1)

A projection device including:

a photographing unit that photographs a sheet on which guided information is entered at a plurality of times of day, the plurality of times of day including a first time of day and a second time of day being later than the first time of day;

an image processing unit that extracts a partial characteristic amount of the sheet at the first time of day and a partial characteristic amount of the sheet at the second time of day to compute, at the second time of day, an amount of movement of the sheet from the first time of day; and a projection unit that projects guiding information for the guided information entered on the sheet, at a coordinate position to which the amount of movement of the sheet, computed by the image processing unit, has been added.

(2)

The projection device according to (1) described above, further including:

a transmitting unit that transmits to an external device image data of the sheet photographed by the photographing unit; and a receiving unit that receives the guiding information generated on a basis of the image data of the sheet in the external device.

(3)

The projection device according to (2) described above, further including a receiving section that instructs the external device to store the image data of the sheet and the guiding information.

(4)

The projection device according to any one of (1) to (3) described above, in which a range of photographing by the photographing unit is larger than a projection range by the projection unit.

(5)

An image processing system including:

an external device that generates guiding information for guided information entered on a sheet, on a basis of image data of the sheet on which the guided information is entered; and a projection device that projects, on the sheet, the guiding information generated by the external device, the projection device having:

a photographing unit that photographs the sheet on which the guided information is entered at a plurality of times of day, the plurality of times of day including a first time of day and a second time of day being later than the first time of day;

an image processing unit that extracts a partial characteristic amount of the sheet at the first time of day and a partial characteristic amount of the sheet at the second time of day to compute, at the second time of day, an amount of movement of the sheet from the first time of day; and a projection unit that projects the guiding information for the guided information entered on the sheet, at a coordinate position to which the amount of movement of the sheet, computed by the image processing unit, has been added.

(6)

The image processing system according to (5) described above, further including:

a transmitting unit that transmits to an external device image data of the sheet photographed by the photographing unit; and a receiving unit that receives the guiding information generated on the basis of the image data of the sheet in the external device, in which the external device includes a distortion correcting section that performs distortion correction of image data of the sheet photographed by the photographing unit, and generates the guiding information on the basis of the image data of the sheet after being distortion-corrected by the distortion correcting section.

(7)

The image processing system according to (6) described above, including a server and terminal equipment, as the external device, in which the server includes the distortion correcting section, and the terminal equipment includes:

a display unit that displays the image data of the sheet after being distortion-corrected by the distortion correcting section; and a guiding information input section that receives input of the guiding information, the guiding information being inputted on the basis of the image data of the sheet displayed on the display unit.

(8)

The image processing system according to (7) described above, including a plurality of the projection devices, in which the server further includes a guidance target identifying unit that identifies one or more projection devices taking an image of the sheet which is a guidance target, of the plurality of the projection devices, on the basis of the image data of the respective sheets from the plurality of projection devices, and notifies the terminal equipment of information regarding the specific projection device, and the terminal equipment generates the guiding information for the guided information entered on the sheet, the sheet being photographed by the specific projection device identified by the guidance target identifying unit.

(9)

The image processing system according to (8) described above, in which the terminal equipment further includes a notifying unit that notifies the specific projection device that the specific projection device is the guidance target.

(10)

The image processing system according to any one of (5) to (9) described above, in which the external device further includes a storage unit that stores the image data of the sheet and the guiding information.

(11)

The image processing system according to (10) described above, in which the storage unit stores:

first data including the image data of the sheet before the guiding information is projected, and the guiding information;

second data including the image data of the sheet after the guiding information is projected, and the guiding information; and third data including the image data of the sheet after the guiding information is projected.

(12)

The image processing system according to any one of (5) to (11) described above, in which the external device includes:

a command recognizing unit that recognizes a command inputted on the sheet; and a command processing unit that performs processing based on the command recognized by the command recognizing unit.

(13)

The image processing system according to (12) described above, in which the external device further includes:

a storage unit that stores character information on the sheet instructed by the command.

(14)

The image processing system according to (12) or (13) described above, in which the projection device further includes a sound output unit, and the command processing unit of the external device instructs the projection device to output sound corresponding to the character information on the sheet as instructed by the command.

(15)

The image processing system according to any one of (12) to (14) described above, in which the sheet includes a region describing a question and the guided information and a region describing information regarding the command.

(16)

The image processing system according to any one of (5) to (15) described above, in which the terminal equipment further includes:

a computing unit that computes information regarding a pixel count displayable in the projection device, and causes the computed information regarding the pixel count to be displayed on the display unit.

The present application is based on and claims priority from Japanese Patent Application No. 2021-13770 filed with the Japan Patent Office on Jan. 29, 2021, the entire contents of which is hereby incorporated by reference.

It should be understood that those skilled in the art could conceive various modifications, combinations, sub-combinations, and alterations depending on design requirements and other factors, insofar as they are within the scope of the appended claims or the equivalents thereof.

The invention claimed is:

1. A projection device, comprising:

a photographing unit that photographs a sheet on which guided information is entered at a plurality of times of day, the plurality of times of day including a first time of day and a second time of day being later than the first time of day;

an image processing unit that extracts a partial characteristic amount of the sheet at the first time of day and a partial characteristic amount of the sheet at the second time of day to compute, at the second time of day, an amount of movement of the sheet from the first time of day; and a projection unit that projects guiding information for the guided information entered on the sheet, at a coordinate position to which the amount of movement of the sheet, computed by the image processing unit, has been added.

2. The projection device according to claim 1, further comprising:

a transmitting unit that transmits, to an external device, image data of the sheet photographed by the photographing unit; and a receiving unit that receives the guiding information generated on a basis of the image data of the sheet in the external device.

3. The projection device according to claim 2, further comprising a receiving section that instructs the external device to store the image data of the sheet and the guiding information.

4. The projection device according to claim 1, wherein a range of photographing by the photographing unit is larger than a projection range by the projection unit.

5. An image processing system, comprising:

an external device that generates guiding information for guided information entered on a sheet, on a basis of image data of the sheet on which the guided information is entered; and a projection device that projects, on the sheet, the guiding information generated by the external device, the projection device including:

a photographing unit that photographs the sheet on which the guided information is entered at a plurality of times of day, the plurality of times of day including a first time of day and a second time of day being later than the first time of day;

an image processing unit that extracts a partial characteristic amount of the sheet at the first time of day and a partial characteristic amount of the sheet at the second time of day to compute, at the second time of day, an amount of movement of the sheet from the first time of day; and a projection unit that projects the guiding information for the guided information entered on the sheet, at a coordinate position to which the amount of movement of the sheet, computed by the image processing unit, has been added.

6. The image processing system according to claim 5, further comprising:

a transmitting unit that transmits, to the external device, the image data of the sheet photographed by the photographing unit; and a receiving unit that receives the guiding information generated on the basis of the image data of the sheet in the external device, wherein the external device includes a distortion correcting section that performs distortion correction of the image data of the sheet photographed by the photographing unit, and generates the guiding information on the basis of the image data of the sheet after being distortion-corrected by the distortion correcting section.

7. The image processing system claim 6, comprising a server and terminal equipment, as the external device, wherein the server includes the distortion correcting section, and the terminal equipment includes:

a display unit that displays the image data of the sheet after being distortion-corrected by the distortion correcting section; and a guiding information input section that receives input of the guiding information, the guiding information being inputted on the basis of the image data of the sheet displayed on the display unit.

8. The image processing system according to claim 7, comprising a plurality of projection devices including the projection device, wherein the server further includes a guidance target identifying unit that identifies one or more projection devices taking an image of the sheet which is a guidance target, of the plurality of projection devices, on the basis of the image data of the respective sheets from the plurality of projection devices, and notifies the terminal equipment of information regarding a specific projection device, and the terminal equipment generates the guiding information for the guided information entered on the sheet, the sheet being photographed by the specific projection device identified by the guidance target identifying unit.

9. The image processing system according to claim 8, wherein the terminal equipment further comprises a notifying unit that notifies the specific projection device that the specific projection device is the guidance target.

10. The image processing system according to claim 5, wherein the external device further comprises a storage unit that stores the image data of the sheet and the guiding information.

11. The image processing system according to claim 10, wherein the storage unit stores:

first data including the image data of the sheet before the guiding information is projected, and the guiding information;

second data including the image data of the sheet after the guiding information is projected, and the guiding information; and third data including the image data of the sheet after the guiding information is projected.

12. The image processing system according to claim 5, wherein the external device comprises:

a command recognizing unit that recognizes a command inputted on the sheet; and a command processing unit that performs processing based on the command recognized by the command recognizing unit.

13. The image processing system according to claim 12, wherein the external device further comprises:

a storage unit that stores character information on the sheet instructed by the command.

14. The image processing system according to claim 12, wherein the projection device further comprises a sound output unit, and the command processing unit of the external device instructs the projection device to output sound corresponding to character information on the sheet as instructed by the command.

15. The image processing system according to claim 12, wherein the sheet includes a region describing a question and the guided information and a region describing information regarding the command.

16. The image processing system according to claim 7, wherein the terminal equipment further comprises:

a computing unit that computes information regarding a pixel count displayable in the projection device, and causes the computed information regarding the pixel count to be displayed on the display unit.

* * * * *